No. 790,558. PATENTED MAY 23, 1905.
G. F. BUTTERFIELD.
COMPOSITE BOOT OR SHOE.
APPLICATION FILED NOV. 14, 1904.
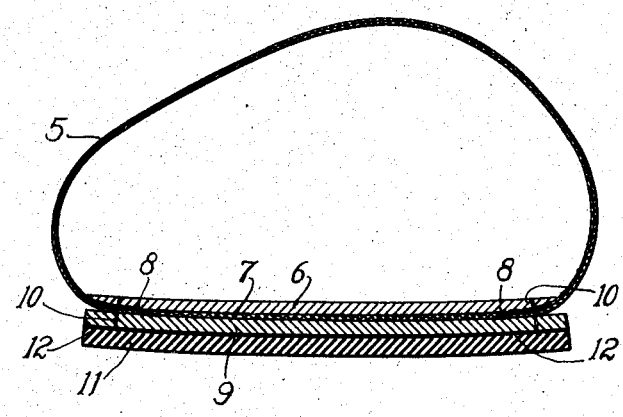
WITNESSES
A. F. Palmer
H. W. Ladd
INVENTOR
George F. Butterfield
BY
ATTY.

No. 790,558. Patented May 23, 1905.

UNITED STATES PATENT OFFICE.

GEORGE F. BUTTERFIELD, OF BOSTON, MASSACHUSETTS, ASSIGNOR TO GRACE I. BUTTERFIELD, OF BOSTON, MASSACHUSETTS.

COMPOSITE BOOT OR SHOE.

SPECIFICATION forming part of Letters Patent No. 790,558, dated May 23, 1905.

Application filed November 14, 1904. Serial No. 232,558.

*To all whom it may concern:*

Be it known that I, GEORGE F. BUTTERFIELD, of Boston, in the county of Suffolk and State of Massachusetts, have invented certain new and useful Improvements in Composite Boots or Shoes, of which the following is a specification.

My present invention is an improved composite boot or shoe consisting, essentially, of a leather or equivalent upper and inner sole united marginally and temporarily in the lasting operation, a sole-shaped leveling-strip of friction-coated rubber-saturated duck applied to the bottom of the inner sole within the inward-turned margins of the upper-leather, a continuous waterproof strip of rubber tape covering the margins of said leveling-strip and insole and interposed between them and the inward-turned edges of the upper, a broad-welt sole of leather which is free from oil and especially adapted to the adhesion of rubber, such welt-sole being raw-rubber coated and sewed marginally to the upper and insole, and, finally, an outsole of rubber secured by vulcanization directly to the bottom of said welt-sole while mechanically held firmly thereto.

The drawing is a transverse section through a shoe embodying my invention.

5 represents the upper-leather provided with the usual lining, and 6 is the insole, applied to the bottom of the last, around which the upper extends, overlapping the margins of the insole and secured thereto in lasting the shoe.

7 is a layer of textile fabric, friction-coated and rubber-saturated, adhering firmly to that part of the bottom of the inner sole not covered by the edges of the upper. A strip of vulcanizable rubber tape 8 covers the edges of the fabric layer 7 and extends to the outer edges of the insole 6. The inward-turned edges of the upper overlap and adhere to it. Said tape softens during vulcanization and penetrates all the interstices, effectually uniting the parts and forming an internal foxing or watertight joint. Beneath the shoe-upper thus lasted I apply a substantial middle sole 9, of leather, covering the entire bottom and extending marginally as a welt around the fore part of the shoe. I much prefer to make this sole of chrome-tanned leather because of the better adhesion of the rubber thereto. A sewed seam 10 unites this sole marginally to the insole 6 and upper 5, passing also through the rubber tape 8. The upper face of this welt-sole 9 adheres firmly to the intermediate fabric layer 7, and thus a firm foundation is laid for the outer or tread sole 11. The outsole 11 is of rubber held to the shoe-bottom in a mold having an internal configuration the reverse of that desired for such rubber sole. The rubber when placed in the mold may be in the unvulcanized or partially vulcanized state and its vulcanization effected or completed under heat and pressure while held in close contact with the bottom of sole 9. A layer 12 of raw rubber being applied to said bottom previously-vulcanized outsoles may be permanently affixed by the vulcanization of such layer, the requisite chemical elements being found in said outsoles. During vulcanization the shoe is held down upon the mold by pressure applied to the inclosed last or foot form and also by marginal clamps bearing down upon the upper edges of the welt-sole 9. Pending such pressure the heat of vulcanizing softens and expands the rubber, which is thereby forced into every crevice, mesh, and pore and the parts of the sole thoroughly united to each other in the transformation which the rubber undergoes.

I claim as my invention—

A composite boot or shoe comprising a leather upper and inner sole, a sole-shaped, rubber-saturated textile layer of less area than the inner sole, applied to the bottom thereof leaving its margins uncovered, a strip of vulcanizable rubber tape covering the edges of said textile layer and the exposed margins of the inner sole and interposed between them and the inward-turned edges of the upper, in combination with a welt-sole of chrome-tanned leather, free from oil and having a coating of raw rubber on its under side, such leather sole being secured by a marginal seam to the upper and inner sole and projecting outwardly therefrom, and with a tread-sole of rubber secured by vulcanization to the coated bottom of said welt-sole, all of the parts being effectually united, substantially as set forth.

In testimony whereof I have affixed my signature in presence of two witnesses.

GEORGE F. BUTTERFIELD.

Witnesses:
H. W. LADD,
A. H. SPENCER.